Oct. 15, 1963

R. D. COLLINS 3,106,787

EDUCATIONAL DEVICE

Filed June 2, 1961

INVENTOR.
ROBERT DOUGLAS COLLINS
BY
Arthur H. Seidel
ATTORNEY.

United States Patent Office 3,106,787
Patented Oct. 15, 1963

3,106,787
EDUCATIONAL DEVICE
Robert Douglas Collins, 2705 Cranston,
Philadelphia 31, Pa.
Filed June 2, 1961, Ser. No. 114,489
7 Claims. (Cl. 35—17)

This invention relates to an educational device, and more particularly, to an educational device for teaching the components and diseases associated with a particular portion of the anatomy of a human being. More specifically, the present invention may be termed an educational device simulating a clinicopathological mid-brain.

Heretofore, the only educational devices available for teaching and/or demonstrating the components and diseases associated with a portion of the anatomy of a human being, such as the mid-brain, were books and/or charts. Such books and/or charts are unidimensional insofar as their use is concerned in the teaching of medical students or patients as to the nature of the components, diseases and deficiencies of the mid-brain. The present invention is in the nature of a three dimensional educational device having removable sections and elements thereby facilitating the teaching of the components and diseases associated with the mid-brain. Thus, three dimensional educational devices stimulate the imagination of a student or patient so that they may more readily comprehend the subject matter.

The brain stem is the axial part of the brain consisting of all except the cerebellum and cerebral cortex and the white matter immediately connected with them, and including the motor and sensory tracts and the nuclei of the cranial nerves. Occasionally, the mid-brain is loosely termed the "brain isthmus." Often, the mid-brain is described as the short constricted portion of the brain which lies in the opening of the tentorium cerebelli and which connects the pons with the inner-brain and hemispheres, and hence is frequently called the isthmus cerebri.

The nerve matter of the brain stem is comprised of nerve tissue having a plurality of tracts and cells. The educational device of the present invention is adapted to be utilized in the explanation of the components of the mid-brain and the relationship between the various cells and tracts and diseases associated with the mid-brain.

It is an object of the present invention to provide a novel educational device.

It is another object of the present invention to provide a novel educational device particularly adapted for teaching the components and diseases of the mid-brain.

It is another object of the present invention to provide a novel educational device having removable components which are adapted to simulate the effect on, absence or presence of various tracts or cells of the mid-brain.

It is still another object of the present invention to provide a novel educational device wherein elements simulating tracts and/or cells of the mid-brain are removably secured to a base simulating the nerve tissue of the mid-brain.

It is still another object of the present invention to provide a novel three dimensional educational device simulating a cross-sectional view of the mid-brain which is inexpensive and simple to manufacture.

Other objects will appear hereinafter.

For the purpose of illustrating the invention there is shown in the drawings forms which are presently preferred, it being understood, however, that this invention is not limited to the precise arrangements and instrumentalities shown.

Referring to the drawing in detail, wherein like numerals indicate like elements, there is shown in FIGURE 1 a perspective view of the educational device of the present invention designated generally as 10.

Figure 1:
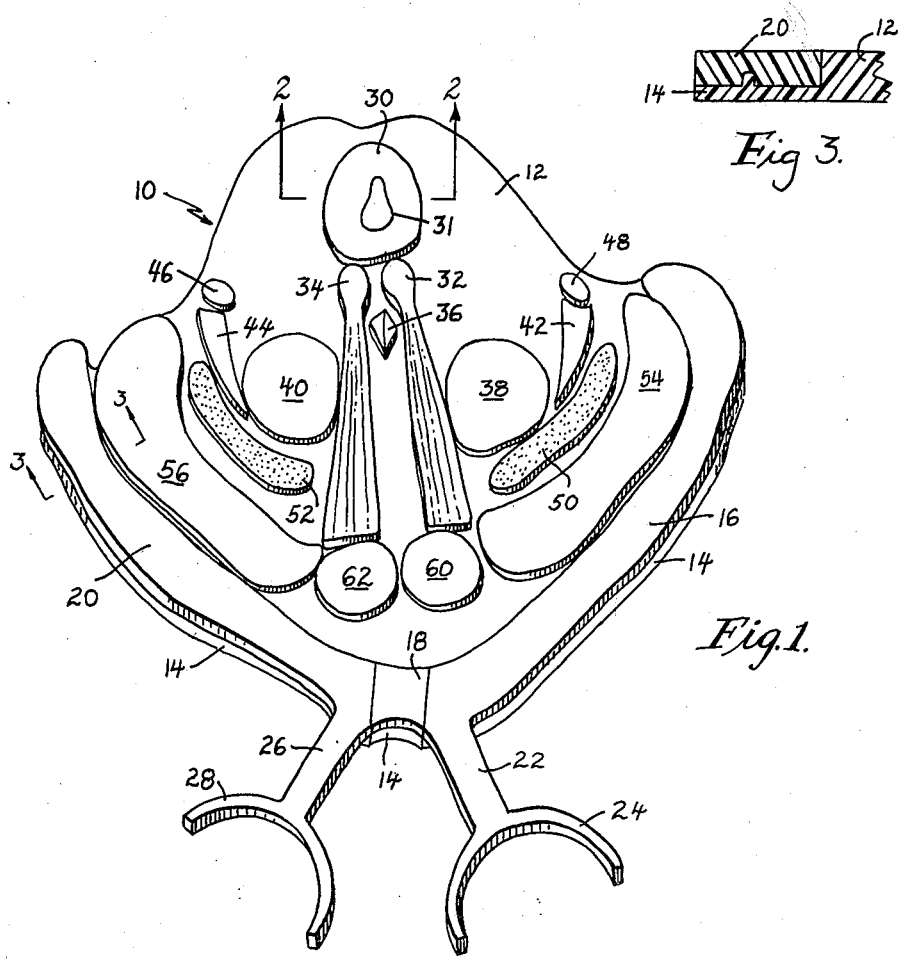
FIGURE 1 is a perspective view of the educational device of the present invention simulating a transverse sectional view of the mid-brain taken through the brain stem approximately at the level of the superior quadrigemina.

The educational device 10 is a substantially planar device illustrating a transverse sectional view of a mid-brain taken approximately at the level of the superior quadrigemina. The device 10 includes a flat base 12 having a peripheral flange 14 extending from approximately one-half of the periphery of the base 12.

An elongated element 16 simulating the left optic tract overlies substantially one-half of the length of the flange 14 and has a width corresponding to the width of the flange 14. A removable element 18 simulating the optic chiasma tract is supported by the flange 14 at a position approximating the center line of the base 12. The element 18 has a width corresponding to the width of the flange 14 and is in abutting contact with a portion of the element 16.

An elongated element 20 which is a mirror image of the element 16 and simulates the right optic tract is supported by the flange 14. The combined length of the elements 16, 18 and 20 corresponds to the length of the flange 14.

Figure 3:
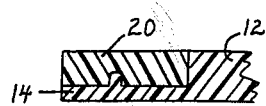
FIGURE 3 is a transverse sectional view taken along the lines 3—3 in FIGURE 1.

As shown more clearly in FIGURE 3, the flange 14 is provided with upstanding studs which are received within blind holes in the element 20 with a friction fit therebetween. It will be understood that the elements 16 and 18 are also provided with blind holes for cooperation with studs on the flange 14. The cooperation between the studs on the flange 14 and the blind holes in the elements 16, 18 and 20 maintains the elements in assembled relationship with respect to the base 12. It will be appreciated by those skilled in the art that the studs may be on the removable elements for cooperation with a blind hole in the base 12 if desired. As illustrated more clearly in FIGURE 3, the combined height of the flange 14 and the removable elements 16, 18 and 20 corresponds with the thickness of the base 12.

The removable element 16 simulating the left optic tract is provided with an extension 22 simulating the left optic nerve. The extension 22 is connected to an arcuate element 24 simulating the nerve cells of the retina of the left eye.

In like manner, the element 20 simulating the right optic tract is provided with an extension 26 connected to an arcuate element 28 which simulates the cells of the retina of the right eye. The thickness of the extensions 22 and 26 and the elements 24 and 28 corresponds with the thickness of the elements 16 and 20.

A wafer-like element 30 is removably secured to the base 12 and simulates periaqueductal gray matter. The element 30 has a closed loop 31 imprinted thereon to simulate the aqueduct. The aqueduct is a narrow canal connecting the third and fourth ventricle and it will be appreciated by those skilled in the art that the shape of the aqueduct varies at different levels in the brain stem.

Removable elements 32 and 34 are removably secured to the base 12 below element 30. The elements 32 and 34 are generally of the shape of an elongated truncated triangle having a circular portion at the small end of the truncated triangle. The elements 32 and 34 simulate the intramedullary portion of the left and right oculomotor nerves. It will be appreciated by those skilled in the art that the oculomotor nerve is organically associated with the eye muscles for effecting eye movements.

A removable element 36 is removably secured to the base 12 intermediate the elements 32 and 34 and simulates the medial longitudinal fasciculus. The medial longitudinal fasciculus is one of the principal longitudinal fiber tracts of the brain stem. An element 38 is removably secured to the base 12 to one side of the element 32 and simulates the left red nucleus cells. A removable element 40 is removably secured to the base 12 to one side of the elements 34 and simulates the right red nucleus cells.

The red nucleus cells illustrated by the removable elements 38 and 40 are often called the rubrum and are so termed because of their reddish tint in the fresh brain. The red nucleus is found subjacent to the superior quadrigemina in those section levels where the substantia nigra has its greatest expansion.

A triangular-shaped element 42 is removably secured to the base 12 in the general location illustrated in FIGURE 1 and simulates the left medial lemniscus. On the opposite side of the base 12, a triangular-shaped element 44 is removably secured to the base 12 and simulates the right medial lemniscus.

A circular element 48 is removably secured to the base 12 above the element 42 and simulates the left spinothalamic tracts. A circular removable element 46 is removably secured to the base 12 above the element 44 and simulates the right spinothalamic tracts. An elongated slightly arcuate element 50 is removably secured to the base 12 below the elements 38 and 42 and simulates the left substantia nigra. An elongated slightly arcuate element 52 is removably secured to the base 12 below the elements 40 and 44 and simulates the right substantia nigra. The substantia nigra or intercalatum are deeply pigmented gray cells.

An elongated crescent shaped element 54 is removably secured to the base 12 below the element 50 and simulates the left pyramidal tract. An elongated crescent shaped element 56 is removably secured to the base 12 below the element 52 and simulates the right pyramidal tract. The pyramidal tract is a direct voluntary motor tract. Circular elements 60 and 62 are removably secured to the base 12 intermediate the adjacent ends of the elements 54 and 56 and respectively simulate the left and right mammilary bodies.

Figure 2:
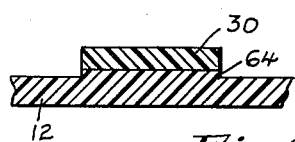
FIGURE 2 is a transverse sectional view taken along the lines 2—2 in FIGURE 1.

As shown more clearly in FIGURE 2, the base 12 is provided with an embossment on the upper surface thereof corresponding to the shape of the various removable elements 30—62. The embossments facilitate the replacement of the removable elements in their proper orientation on the base 12. Thus, the base 12 may be provided with an embossment 64 corresponding to the size and shape of the element 30.

Figure 4:
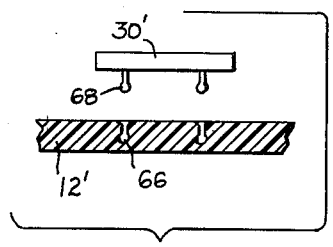
FIGURE 4 is a sectional view of an alternative embodiment, with the illustration being comparable to the sectional view illustrated in FIGURE 2.

A sectional view corresponding to FIGURE 2 is illustrated in FIGURE 4. The alternative embodiment illustrated in FIGURE 4 is identical with the embodiment illustrated in FIGURES 1–3 except as will be made clear hereinafter. A wide variety of means are available to removably secure the elements 30—62 to the upper surface of the base 12. Thus, the embodiment illustrated in FIGURE 4 differs from the embodiment illustrated in FIGURES 1–3 by utilizing an integral stud on the removable elements, with the stud being adapted to be received within a blind hole in the base with a friction fit therebetween.

Thus, the base 12' as illustrated in FIGURE 4 is provided with a pair of blind holes 66 which are adapted to receive studs 68 integrally secured to the lowermost surface of removable element 30'. Removable element 30' simulates the identical component as element 30. Preferably, each of the removable elements of the embodiment illustrated in FIGURE 4 are provided with a pair of studs. Since there are no embossments on the upper surface of the base 12', the replacement of the removable elements in their proper orientation may be utilized as a means for testing the knowledge of the student in regard to the components and orientation thereof of the mid-brain.

When the educational device of the present invention is being utilized, the base will be held by the instructor and the various components of the mid-brain will be enumerated and explained. As a component is explained, the removable element corresponding thereto may be removed from its securement with the base.

In a discussion centered around the various diseases associated with the mid-brain, the removability of the elements simulating the components of the mid-brain are of great significance. Thus, the removability of the elements simulating the components of the mid-brain facilitates the simulation of the pathology of the various diseases associated with the mid-brain. The following table is illustrative of several diseases which may be more effectively illustrated and explained by removing the designated elements.

| Disease— | Removable element |
|---|---|
| Wernicke's encephalopathy | 30, 32, 34, 60 and 62. |
| Weber's syndrome of Vascular occlusion | 32, 40. |
| Parkinsonism | 50 and 52. |
| Craniopharyngeoma | 18. |
| Benedikt's syndrome of Vascular occlusion | 32, 38. |

It will be appreciated that the above table is merely illustrative of the various diseases which may be effectively explained by means of the educational device of the present invention.

Thus, it will be seen that I have invented a novel educational device simulating a clinicopathological mid-brain wherein elements simulating nerve cells and nerve tracts are removably secured to a base, whereby the components and diseases of the mid-brain may be more effectively taught to a novice.

The present invention may be embodied in other specific forms without departing from the spirit or essential attributes thereof and, accordingly, reference should be made to the appended claims, rather than to the foregoing specification as indicating the scope of the invention.

I claim:

1. An educational device comprising means simulating a clinicopathological mid-brain including a flat base, symmetrically disposed elements simulating components of the mid-brain, said components including nerve cells, nerve tracts and gray matter, means removably securing said elements to said base in accordance with the physiological functions of the simulated components of said elements, whereby the components and diseases of the mid-brain may be more effectively taught to a novice.

2. An educational device comprising means simulating a clinicopathological mid-brain said means including a flat base, a flange extending from said base from a portion of the periphery of said base, elongated elements simulating optic nerve tracts supported by said flange, elements simulating nerve tracts removably secured to said base, elements simulating nerve cells removably secured to said base, elements simulating gray matter removably secured to said base, elements simulating pyramidal tracts removably secured to said base, elements simulating oculomotor nerves removably secured to said base, each element being disposed on the same side of said base, whereby the components and diseases of the mid-brain may be more effectively taught to a novice.

3. An educational device in accordance with claim 2 wherein said optic tracts are provided with extensions, each extension terminating in an arcuate portion simulating the retina of an eye.

4. An educational device in accordnace with claim 3 including an element supported by said flange and simulating the optic chiasma tract, said last mentioned element being supported on said flange in a position so as to be disposed intermediate the optic nerve tracts supported by said flange.

5. An educational device comprising means simulating a clinicopathological mid-brain said means including a flat base, a flange extending from the periphery of said base, the lowermost surface of said flange being substantially flush with the lowermost surface on said base, a pair of elongated elements supported by said flange and simulating optic tracts, means removably securing said elements to said flange, the uppermost surface of said elements being substantially flush with the uppermost surface of said base, means removably securing a plurality of symmetrically disposed elements to the uppermost surface of said base thereby simulating components of the mid-brain including nerve cells, nerve tracts and gray matter, whereby the components and diseases of the midbrain may be more effectively taught to a novice.

6. An educational device in accordance with claim 5 wherein said means for removably securing elements to said base thereby simulating nerve cells include a pressure sensitive adhesive coating on one surface of elements.

7. An educational device in accordance with claim 5 wherein said means removably securing elements to the upper surface of said base includes integral studs on one surface of said elements, said studs being received within holes in said base with a friction fit therebetween.

References Cited in the file of this patent

UNITED STATES PATENTS

| | | |
|---|---|---|
| 1,381,957 | Anderson | June 21, 1921 |
| 2,256,667 | Doret | Sept. 23, 1941 |
| 2,592,078 | Taylor et al. | Apr. 8, 1952 |
| 2,995,833 | Bezark | Aug. 15, 1961 |

OTHER REFERENCES

Chicago Apparatus Co. Catalog No. 44 (1931), pages 790 and 791 only are relied on.

Clay-Adams Catalog No. 105 (1953), pages 168 and 169 only relied on.